(12) United States Patent
Chiplunkar et al.

(10) Patent No.: US 11,321,135 B2
(45) Date of Patent: May 3, 2022

(54) RATE LIMITING COMPLIANCE ASSESSMENTS WITH MULTI-LAYER FAIR SHARE SCHEDULING

(71) Applicant: Oracle International Corporation, Redwood Shores, CA (US)

(72) Inventors: Amol Achyut Chiplunkar, Pleasanton, CA (US); Prasad Ravuri, San Jose, CA (US); Karl Dias, Foster City, CA (US); Gayatri Tripathi, Bengaluru (IN); Shriram Krishnan, Oakland, CA (US); Chaitra Jayaram, Pleasanton, CA (US)

(73) Assignee: Oracle International Corporation, Redwood Shores, CA (US)

( * ) Notice: Subject to any disclaimer, the term of this patent is extended or adjusted under 35 U.S.C. 154(b) by 166 days.

(21) Appl. No.: 16/670,072

(22) Filed: Oct. 31, 2019

(65) Prior Publication Data
US 2021/0132993 A1 May 6, 2021

(51) Int. Cl.
| | |
|---|---|
| *G06F 9/46* | (2006.01) |
| *G06F 9/50* | (2006.01) |
| *G06F 9/54* | (2006.01) |
| *G06F 9/32* | (2018.01) |

(52) U.S. Cl.
CPC .............. *G06F 9/505* (2013.01); *G06F 9/321* (2013.01); *G06F 9/5038* (2013.01); *G06F 9/546* (2013.01); *G06F 2209/503* (2013.01); *G06F 2209/5019* (2013.01)

(58) Field of Classification Search
CPC .......... G06F 9/505; G06F 9/546; G06F 9/321; G06F 9/5038; G06F 2209/5019; G06F 2209/503
See application file for complete search history.

(56) References Cited

U.S. PATENT DOCUMENTS

| | | | | |
|---|---|---|---|---|
| 5,495,607 | A * | 2/1996 | Pisello ................. | G06F 16/168 707/797 |
| 5,901,334 | A * | 5/1999 | Banks ..................... | G06F 9/544 710/56 |
| 6,721,325 | B1 * | 4/2004 | Duckering .......... | H04L 12/5602 370/230.1 |
| 8,578,093 | B1 * | 11/2013 | Dafoe ................... | G06F 3/0604 711/114 |
| 8,914,497 | B1 * | 12/2014 | Xiao ....................... | H04L 67/42 709/224 |
| 9,300,691 | B1 * | 3/2016 | Banerjee ................ | H04L 41/28 |

(Continued)

*Primary Examiner* — Adam Lee
(74) *Attorney, Agent, or Firm* — Invoke

(57) ABSTRACT

The embodiments disclosed herein relate to predictive rate limiting. A workload for completing a request is predicted based on, for example, characteristics of a ruleset to be applied and characteristics of a target set upon which the ruleset is to be applied. The workload is mapped to a set of tokens or credits. If a requestor has sufficient tokens to cover the workload for the request, the request is processed. The request may be processed in accordance with a set of processing queues. Each processing queue is associated with a maximum per-tenant workload. A request may be added to a processing queue as long as adding the request does not result in exceeding the maximum per-tenant workload. Requests within a processing queue may be processed in a First In First Out (FIFO) order.

23 Claims, 5 Drawing Sheets

(56) References Cited

U.S. PATENT DOCUMENTS

| | | | |
|---|---|---|---|
| 9,639,398 B1* | 5/2017 | Kusters | G06F 9/5033 |
| 9,703,602 B1* | 7/2017 | Kusters | G06F 9/4881 |
| 10,439,952 B1* | 10/2019 | Mitulal | H04L 47/62 |
| 10,587,527 B1* | 3/2020 | Paulzagade | H04L 47/781 |
| 2002/0181692 A1* | 12/2002 | Flockhart | H04M 3/51 |
| | | | 379/266.06 |
| 2005/0129046 A1* | 6/2005 | Kumar | H04L 49/90 |
| | | | 370/428 |
| 2005/0207417 A1* | 9/2005 | Ogawa | H04L 47/6215 |
| | | | 370/390 |
| 2009/0228589 A1* | 9/2009 | Korupolu | H04L 67/1002 |
| | | | 709/226 |
| 2010/0251263 A1* | 9/2010 | Coelho | G06F 11/0748 |
| | | | 719/314 |
| 2011/0078290 A1* | 3/2011 | Calo | G06F 9/5094 |
| | | | 709/221 |
| 2011/0159868 A1* | 6/2011 | Granda | H04L 41/5061 |
| | | | 455/423 |
| 2011/0296310 A1* | 12/2011 | Carmel | G06Q 30/0621 |
| | | | 706/47 |
| 2011/0299397 A1* | 12/2011 | Fukuchi | H04L 47/10 |
| | | | 370/235.1 |
| 2012/0059962 A1* | 3/2012 | Lai | G06F 13/364 |
| | | | 710/244 |
| 2012/0324160 A1* | 12/2012 | Liu | G06F 3/0689 |
| | | | 711/112 |
| 2014/0036695 A1* | 2/2014 | Ziegler | H04L 49/901 |
| | | | 370/252 |
| 2014/0036876 A1* | 2/2014 | Li | H04W 4/70 |
| | | | 370/336 |
| 2014/0317360 A1* | 10/2014 | Campbell | G06F 13/1615 |
| | | | 711/148 |
| 2014/0380330 A1* | 12/2014 | Xiao | G06F 9/5016 |
| | | | 718/104 |
| 2015/0263978 A1* | 9/2015 | Olson | G06F 3/061 |
| | | | 709/226 |
| 2015/0310900 A1* | 10/2015 | Schaub | G09G 5/363 |
| | | | 711/106 |
| 2015/0378620 A1* | 12/2015 | Brown | G06F 3/0619 |
| | | | 711/162 |
| 2016/0092150 A1* | 3/2016 | De Groot | G06F 3/1285 |
| | | | 358/1.15 |
| 2016/0210175 A1* | 7/2016 | Morimura | G06F 9/45533 |
| 2016/0299957 A1* | 10/2016 | Charan | G06F 16/254 |
| 2017/0067962 A1* | 3/2017 | Schreier | H04L 67/10 |
| 2017/0139650 A1* | 5/2017 | Iliadis | G06F 3/0689 |
| 2017/0249229 A1* | 8/2017 | Walton | G06F 16/2379 |
| 2017/0286186 A1* | 10/2017 | Kagan | G06F 9/4812 |
| 2018/0018097 A1* | 1/2018 | Kazakov | G06F 13/1663 |
| 2018/0212885 A1* | 7/2018 | Contavalli | H04L 47/193 |
| 2018/0343257 A1* | 11/2018 | Frankel | H04L 63/20 |
| 2019/0089713 A1* | 3/2019 | Leftwich | H04L 63/10 |
| 2019/0235894 A1* | 8/2019 | Wang | G06F 9/5027 |
| 2019/0272335 A1* | 9/2019 | Liu | G06F 16/21 |
| 2020/0026468 A1* | 1/2020 | Kang | G06F 3/0665 |
| 2020/0026566 A1* | 1/2020 | Baggerman | G06F 40/186 |
| 2020/0409754 A1* | 12/2020 | Li | G06F 9/466 |

* cited by examiner

RATE LIMITING COMPLIANCE ASSESSMENTS WITH MULTI-LAYER FAIR SHARE SCHEDULING

TECHNICAL FIELD

Techniques are presented herein for building a dynamic rate limiting mechanism in a multi-tenant environment. The dynamic rate limiting mechanism provides fair treatment to the tenants and users of shared compute resources.

BACKGROUND

There are many instances in which a computing provider uses shared computing power to perform tasks for different tenants in a multi-tenant computing environment. This is common, for example, in mainframe computers, cloud computing, thin-client computing, and the like. If tenants' computing tasks are not carefully scheduled, a single tenant can intentionally or unintentionally affect the performance of other tenants using the same computing provider. As an example, a particular tenant may request a set of computationally expensive operations and/or a large number of operations within a short period of time. Executing the particular tenant's operations may consume a significant portion of the shared compute resources, thereby reducing availability and causing delays for other tenants' requests.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
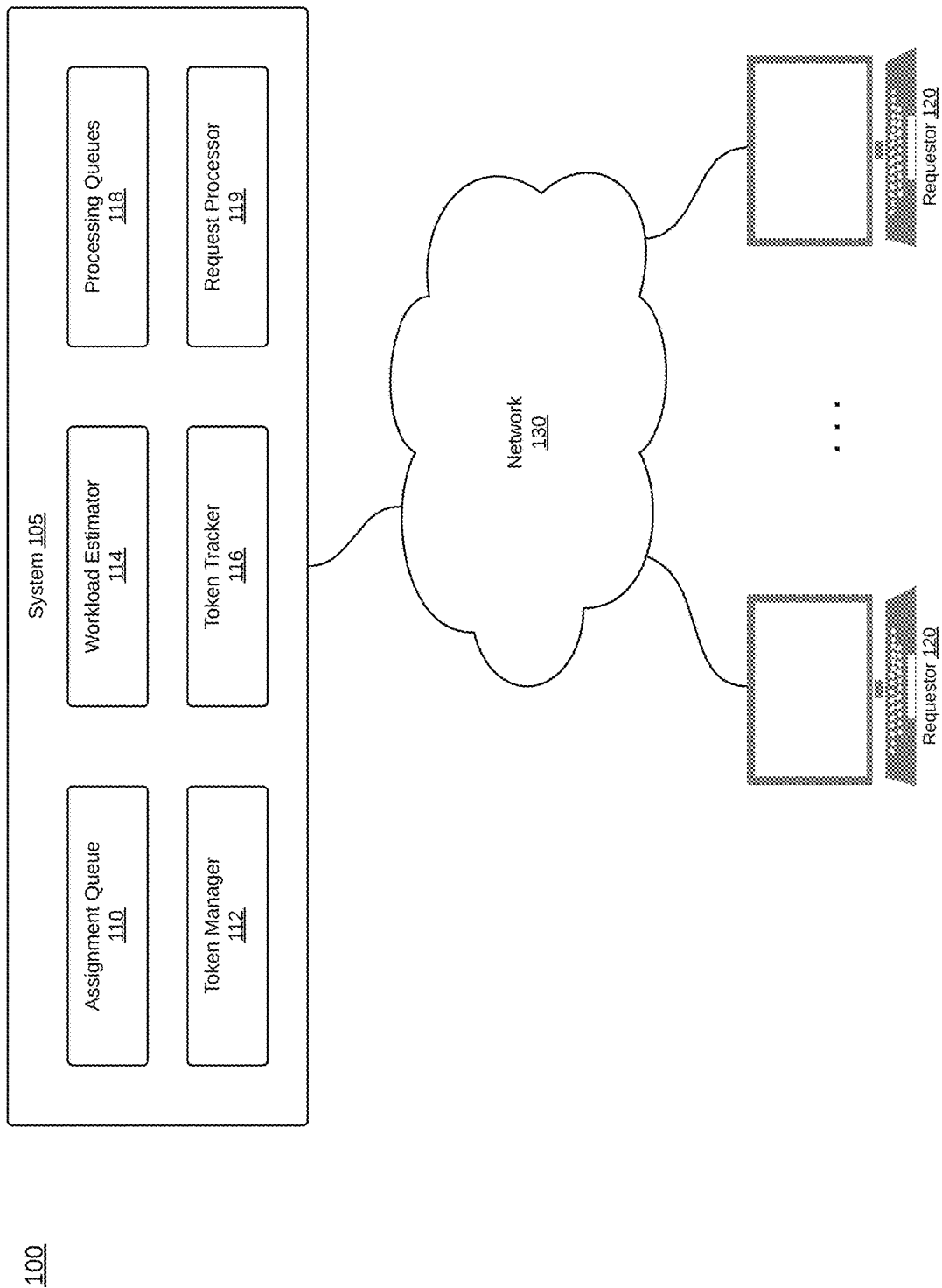
FIG. 1 is a block diagram that illustrates components of the system, in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. REQUEST PROCESSING SYSTEM
3. PREDICTIVE RATE LIMITING
4. MULTI-LAYER QUEUING
5. EXAMPLE EMBODIMENTS
6. COMPUTER NETWORKS AND CLOUD NETWORKS
7. HARDWARE OVERVIEW

1. GENERAL OVERVIEW

One or more embodiments balance usage of shared resources across multiple tenants in a multi-tenant compute environment. The system implements a set of processing queues for managing pending compute requests. The workload for any particular compute request may be determined as a function of (a) the characteristics of targets for the particular compute request and (b) a ruleset to be applied for completing the particular compute request. A tenant's workload for a queue is a total of workloads corresponding to the tenant's requests within that queue.

Compute requests from a tenant may be added to a queue based on a maximum per-tenant workload for the queue. If adding a tenant's compute request to a particular queue would result in the tenant's total workload for the particular queue exceeding the maximum per-tenant workload for that particular queue, then the request cannot be added to the particular queue. The system may sequentially attempt to add a tenant's request to various queues until the request is successfully added to a queue. The system may attempt to add the request to the queues in order of queue priority.

The system may be configured with an overflow queue which does not have a maximum per-tenant workload. However, other restraints may be applied to the overflow queue such as, for example, allowing a single request per tenant in the overflow queue. Requests in the overflow queue may be completed in accordance with a prioritization scheme, or may be re-submitted to the queue assignment process described above. Furthermore, requests that are not added to any of the queues may be rejected or re-submitted for the queue assignment process described above.

One or more embodiments implement a token-based system for usage of shared resources in a multi-tenant compute environment. Tokens are periodically added to each tenant's token account. The queue assignment process, as described above, may be applied to a tenant's compute request if the tenant's token account has sufficient tokens required for the compute request. The tokens required for the compute request are a function of the workload determined for the compute request. As state above, the workload may be determined as a function of (a) the characteristics of targets for the particular compute request and (b) a ruleset to be applied for completing the particular compute request.

One or more embodiments described in this Specification and/or recited in the claims may not be included in the General Overview section.

2. REQUEST PROCESSING SYSTEM

FIG. 1 is a block diagram that illustrates components of an example system 100, in accordance with one or more embodiments. System 100 is a multi-tenant system in which a compute provider uses shared resources to execute computing requests received from multiple different tenants. System 100 may include more or fewer components than the components illustrated in FIG. 1. The components illustrated in FIG. 1 may be local or remote from each other. The components may be implemented in software and/or hardware. Each component may be distributed over multiple applications and/or machines. Multiple components may be combined into one application and/or machine. Operations described with respect to one component may instead be performed by another component.

A computing request, as referred to herein, is a request to execute one or more operations on a data set. The operations may result in modifying, deleting, or adding data to the data set. The operations may also result in not making any changes to the data set. The operations may generate a result based on the data set.

The operations may include execution of a set of rules (also referred to herein as a ruleset) on a target object/record in the data set. The execution of the ruleset determines whether the target object/record complies with a particular condition referenced by the ruleset. The time and/or resources necessary to execute the operations may depend on characteristics (e.g., size or count) of the target objects/records and characteristics (e.g., complexity or number of operations to-be-executed) of the rule set being applied.

The time and/or resources necessary to execute the operations corresponding to a request may be represented as or referred to as a "workload" corresponding to the request. The workload for a request may be a single value or a combination of values based at least in part on the time and/or resources necessary for completing the request. In an example, the workload may be a single number corresponding to the number of processor cycles necessary to complete the request.

In an example, a computing request corresponds to a compliance assessment. The compliance assessment may determine whether stored objects are in compliance with a particular policy. The compliance assessment may involve evaluating stored values based on a compliance criteria. The compliance assessment may, for example, determine if a set of values are backed up with sufficient copies in accordance with a data back-up policy. A computing request may require determining whether system components are operating in an intended manner. As an example, the computing request may include a request for data (performance statistics, vulnerabilities, or errors) corresponding to a target object. The computing request may further evaluate the data to determine whether a particular condition is met. The computing request may trigger actions based on whether the particular condition is met.

A computing request may be transmitted by a requestor 120. A requestor 120 is any type of software and/or device that transmits a request for execution to the request processing system 105. Examples of requestors 120 include, but are not limited to servers, laptops, desktops, mainframes, tablets, mobile phones, applications, and services. In a multi-tenant system, there may be multiple requestors 120, each requestor corresponding to one of a set of tenants. While only two requestors are shown in FIG. 1, it should be understood that any number of requestors may be present in various embodiments. Each of the requestors 120 may be a separate computer system that utilizes system 105 to perform certain computing tasks. A requestor 120 may include multiple client devices that transmit requests on behalf of a same tenant. There may be various reasons for requestors 120 to utilize a computing service such as system 105. For example, in some instances a requestor may be a web server optimized to perform database tasks. In some instances, requestor may have a relatively low computing capability (such as a mobile phone), and utilizes system 105 to perform more complex computing tasks. There can be many other different reasons to use system 105.

Each of the requestors 120 is coupled to a network 130. Network 130 may be any type of communications network. In some embodiments, network 130 is the Internet. Communications over network 130 may occur through the use of one or more communication protocols according to a client-server model, such as by submitting HTTP requests to invoke one or more of the services and receiving HTTP responses comprising results generated by one or more of the invoked services. It should be understood that other communication protocols also may be used.

In an embodiment, the request processing system 105 includes a set of applications and/or web services that may be invoked to perform operations as further described herein. System 105 may include an assignment queue 110, a token manager 112, a workload estimator 114, a token tracker 116, processing queues 118, and request processors 119. System 105 may be implemented on a single computing machine. In some embodiments, system 105 may be multiple computing systems, such as multiple computing systems located in a data center. In some embodiments with multiple computing systems, the multiple computing systems may all be at a single location. In some embodiments with multiple computing system, some of the multiple computing systems may be located remotely from other of the multiple computing systems, with the multiple computing systems communicating via network 130.

Token manager 112 may maintain tokens for each requestor. The token manager 112 may periodically credit tokens to each requestor's token account. Furthermore, the token manager 112 may debit tokens from a requestor's token account corresponding to a workload of requests from the requestor. The token manager 112 may also report the number of tokens in a requestor's token account to determine if the requestor has sufficient tokens for completing a request.

Workload estimator 114 may be configured to estimate a workload corresponding to a computing request. As described below in further detail, the workload may be based determined based on resources and/or time that will be necessary to perform a computing request.

Figure 4:
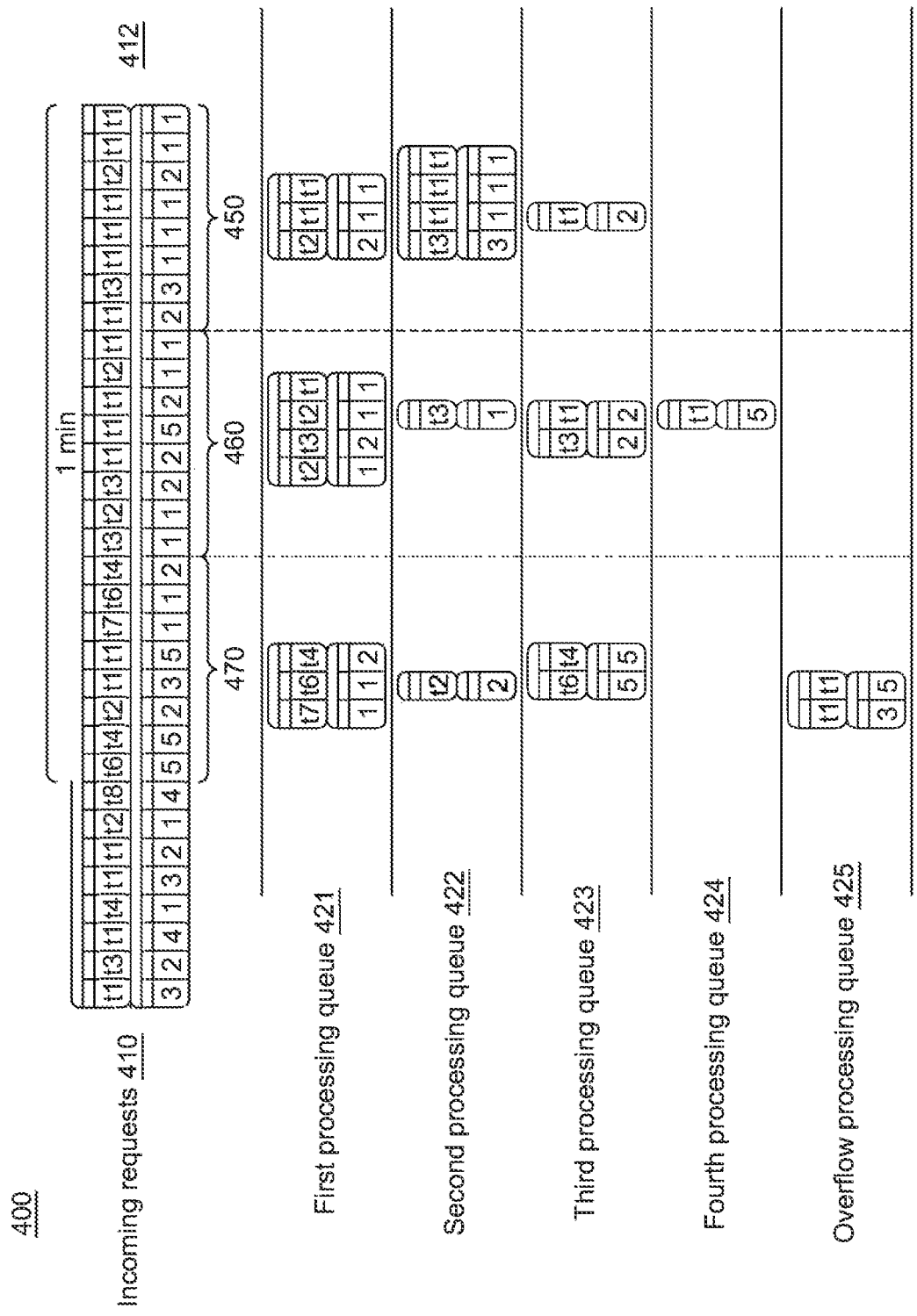
FIG. 4 is a diagram illustrating the process of assigning tasks to one of multiple queues, in accordance with one or more embodiments.

Assignment queue 110 corresponds to one or more queues for storing incoming computing requests from requestors 120. As an example, FIG. 4 illustrates an assignment queue with incoming requests 410. Computing requests may be assigned from the assignment queue 110 to one of the processing queues 118. Assignment queues may be maintained by third parties that receive the requests from the requestors 120.

Processing queues 118 correspond to queues for queuing computing requests until they are processed by a request processor 119. As an example, FIG. 4 illustrates a set of processing queues 421-425. Each of the processing queues 118 may be associated with different criteria. As an example, different processing queues may be configured with different maximum per-tenant workloads. The maximum per-tenant workload for a queue is used to determine whether or not to add a new computing request from a tenant to the queue. A particular type of processing queue, referred to herein as an overflow queue, may not be configured with any maximum per-tenant workload. However, other restraints may be applied to the overflow queue such as, for example, allowing a single request per tenant in the overflow queue. Requests in the overflow queue may be completed in accordance with a prioritization scheme, or may be re-submitted to the assignment queue for a delayed assignment to one of the processing queues.

Request processor 119 corresponds to software and/or hardware configured to complete a computing request by executing one or more operations corresponding to the computing request. Request processor 119 may include or may use a hardware processor, a virtual process, a thread or a portion thereof. System 105 may include any number of request processors 119. A single shared request processor 119 may execute computing requests from the processing queues 118. The request processor 119 may complete a different number of computing requests from different processing queues 118 during a given period. Each processing queue 118 may be associated with its own respective request processor 119 that executes computing requests within that processing queue 118.

3. PREDICTIVE RATE LIMITING

Figure 2:
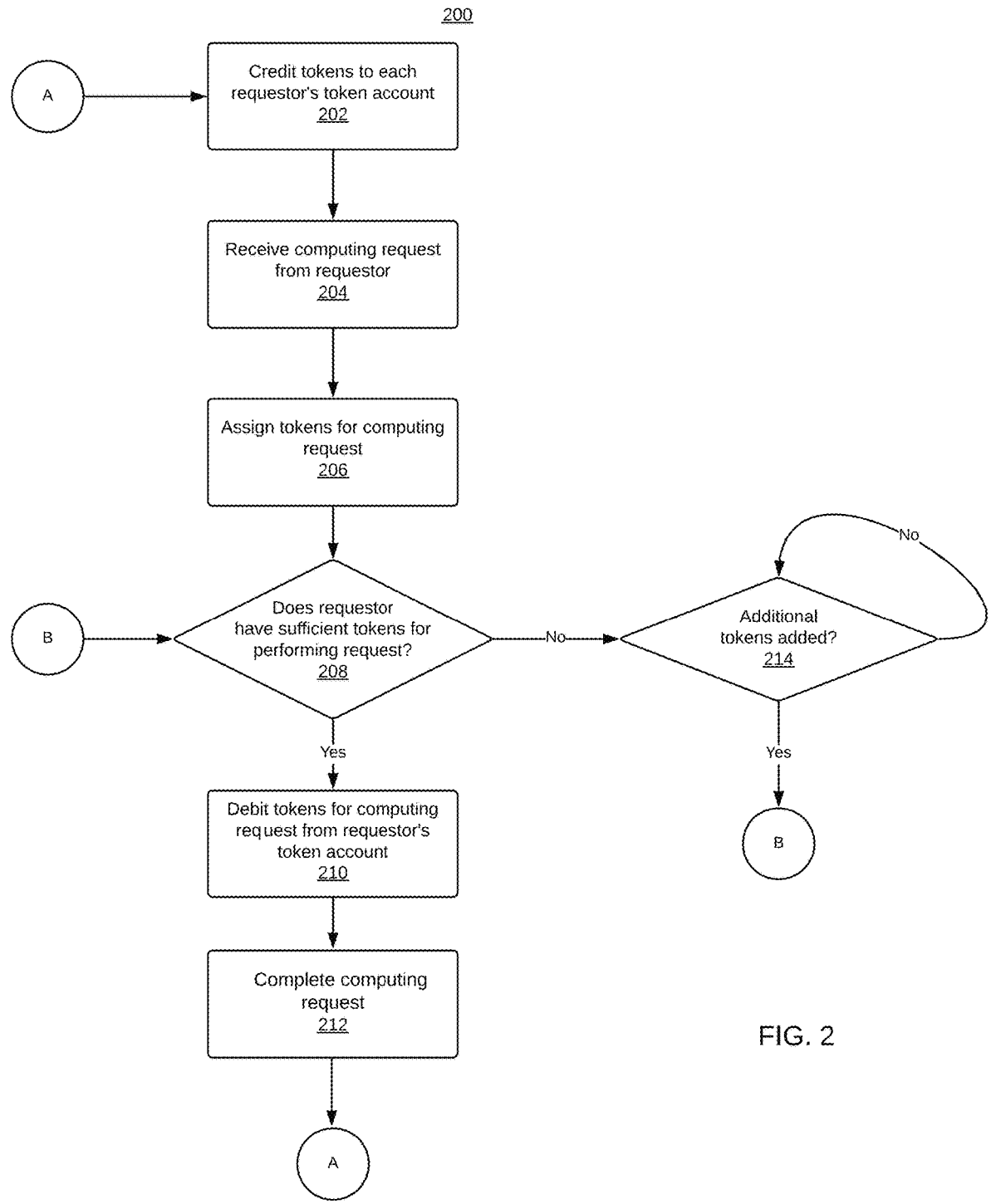
FIG. 2 is a flow diagram that illustrates performing computing requests based on a number of tokens needed for the computing request, in accordance with one or more embodiments.

In some embodiments, the request processing system throttles computing requests to avoid a subset of tenants over-consuming shared resources at the expense of other tenants. With reference to FIG. 2, a flow diagram 200 illustrates the overall process of predictive rate limiting that limits requests based on a predicted workload of the requests. One or more operations illustrated in FIG. 2 may be modified, rearranged, or omitted altogether. Accordingly, the particular sequence of operations illustrated in FIG. 2 should not be construed as limiting the scope of one or more embodiments.

Initially, the system credits tokens to each requestor's token account (operation 202). The system may credit tokens periodically in accordance with a token crediting schedule. A different number of tokens may be credited to different requestors. As an example, the number of tokens credited to each requestor may be based on the level of service purchased by the requestor. In some embodiments, tokens may be periodically credited to each requestor until a maximum token count is reached. Once the maximum token count is reached, no additional tokens are credited until some of the tokens are debited as described below.

In some cloud computing or mainframe computing environments, a requestor may purchase computing power. Thus, the number of tokens assigned to the requestor may be dependent on an amount of computing power purchased by the requestor. In some computing environments, each requestor may be metered such that they are charged for how much computing power they use. However, even in those environments, they system may place an upper limit on how much computing power a requestor can use in a particular time period.

In an embodiment, the system receives a computing request from a requestor (operation 204). The computing request may be transmitted from the requestor to the system via a pull mechanism or a push mechanism. The computing requests may be communicated through an interface, such as a client interface (such as a web browser), a program interface, or an application programming interface (API). The requestor may send the request to the system via a computer network, such as a private network, an intranet, or the Internet. The computing requests may be generated in accordance with a schedule. As an example, the computing request may correspond to a compliance check that is periodically executed to ensure continual compliance with a set of requirements.

The system assigns a number of tokens to the computing request based on an estimated workload (operation 206). As explained above, the time and/or resources necessary to execute the operations corresponding to a computing request may be represented as or referred to as a "workload" corresponding to the computing request. Estimating (also referred to herein as predicting) the workload may include executing a function that outputs a value representing the workload. The function may accept, as input, characteristics of a rule set. The characteristics of the rule set accepted by the function may include, for example, the number of rules in the rule set, the average execution time of a rule, a rule complexity metric, and number of steps/operations for the rule set. The function may further accept, as input, characteristics of a target set applicable to the workload request. The characteristics of the target set accepted by the function may include, for example, a number of targets, a number of components (e.g., rows) in a target, a value corresponding to a type of the targets, a location of the target, and an average execution time of operations executed on the target. Other factors can be considered when determining the workload, including, but not limited to: number of rules being evaluated, type of ruleset (cloud, custom, scap), type of assessment (result uploads, cloud, agent based), and the size of the incoming payload, in case of result uploads.

If the workload for a computing request is represented using a numerical value, the numerical value may be selected as a number of tokens for the workload request. Alternatively, or in addition, a hash or other function applied to the workload value determines the number of tokens for the workload request.

In an example, 50 units of work are assigned to each ruleset and 1 unit is added for each target. Thus, an assessment with 1 ruleset and 100 targets is assigned 150 tokens (50 for the ruleset and 100 for the targets). An assessment may include more than one ruleset. Each ruleset can be of different types, shapes, and sizes. The number of targets is an additional variable to consider when estimating the units of work. The number of tokens assigned for a ruleset may vary based on the number of rules in the ruleset. A ruleset with a particularly large number of rules may be assigned more than 50 tokens. Another exemplary compliance check may be to determine the IP address of 1000 computing instances. Determining the IP address may be assigned 50 tokens. This computing request would be assigned 1050 tokens.

A token may be an arbitrary unit. Thus, an amount greater than 50 tokens may be assigned for each ruleset and an amount greater than 1 token may be assigned for each target of the computing request. It should further be understood that the ratio of 50 to 1 is merely exemplary and different ratios may be used based on the computing resources needed to complete different types of computing requests. It should further be understood that, while embodiments are discussed with respect to compliance assessments, embodiments also can include any type of computing request.

One or more embodiments determine if the requestor has a sufficient amount of tokens to perform the computing request (operation 208). The requestor has sufficient tokens if the number of tokens necessary for completing the computing request (based on the estimated workload) is less than or equal to the tokens currently assigned to the requestor.

If the requestor has a sufficient number of tokens to perform the computing request, the requestor is debited the number of tokens to perform the computing request (operation 210). For example, a computing request may require 1050 tokens. If the requestor had 2000 tokens, the 1050 tokens to perform the computing request is deducted from the 2000 tokens that the requestor has, leaving the requestor with 950 tokens. The computing request is then completed (Operation 212). The computing request may be completed immediately or at a later time based on a queue(s) as described below in relation to FIG. 3. Completing the request may generate a result that may be returned to a requestor of the request. As an example, in a compliance check, a requestor may request an update only if there is an error or compliance failure. Another requestor may specify that the result of every check is to be returned to the requestor, whether or not a particular check is passed or failed. After the computing request is completed, operation resumes at operation 202.

If the requestor does not have sufficient tokens to perform the computing request, it is determined if additional tokens have been added (operation 214). If no tokens have been added, the system does not proceed with completing the request. If tokens have been added, operation continues to operation 206, to determine if the requestor now has sufficient tokens to perform the task. The computing request may also be cancelled (not shown) which results in terminating the process for completing the computing request.

Continuing the above example, the requestor had 950 tokens remaining after submitting a computing request that was completed by the request. If that requestor then submits another computing request that uses 1050 tokens, operation 206 will not be satisfied. Operation continues at operation 214 until the requestor is credited with additional tokens. Thus, the computing request is refrained from being completed. When being credited with additional tokens, the requestor may receive an additional 2000 tokens. The requestor thus has enough tokens to perform the computing request (as checked in operation 208) and operation of the request can finally occur at operation 210. The result from the point of view of the requestor is that it had to wait until it was assigned additional tokens to perform the computing request. This allowed the system 105 to perform computing requests from other requestors without the first requestor using all the computing resources of system 105.

It should be understood that, while the operations of FIG. 2 are conducted for a first requestor, the same operations can occur for a second requestor or any number of requestors that are using the computing services of system 105.

There can be a variety of different manners in which tokens can be assigned to each requestor. As stated above, a requestor can be assigned a set number of tokens at a periodic interval. The periodic interval can be set to any length. In some embodiments, an interval of twenty seconds can be used. In such an embodiment, each requestor may be assigned 2000 tokens every twenty seconds.

4. MULTI-LAYER RATE LIMITING

Multi-layer rate limiting involves the concurrent use of multiple processing queues. Rate limiting requests in an example set of processing queues is described below, with reference to FIG. 3. While a specific number of queues and specific queue characteristics are described below, embodiments are equally applicable to any number of queues with any characteristics.

In an embodiment, an assignment queue 312 receives computing requests 302. The computing requests may be added to the assignment queue subsequent to receipt from one of a set of requestors. Adding the computing requests 302 to the assignment queue may be conditioned upon the requests meeting certain criteria. As an example, computing requests 302 may be added to the assignment queue only if a requestor has sufficient tokens for completing the computing request, as described above with reference to FIG. 2. As a result, the assignment queue 312 may only receive requests from requestors with sufficient tokens to complete the request. Alternatively, the assignment queue may implement the token mechanism described above. In this alternate scenario, the assignment queue determines if the requestor has sufficient tokens. If the requestor has sufficient tokens, then the assignment queue may assign the request to one of the processing queues as described above. If the requestor does not have sufficient tokens, the assignment queue may deny the request or move the request to the back of the assignment queue.

In an embodiment, the assignment queue 312 is configured to assign the computing requests to one of the processing queues. As described above, a subset of the processing queues (e.g., processing queues 322-326) may be associated with different criteria such as different maximum per-tenant workloads. The assignment queue 312 may first attempt to add a request to the first processing queue 322. If the total of (a) the estimated workload for the request and (b) estimated workload of requests within the first processing queue 322 from the same requestor exceeds the maximum per-tenant workload for the first processing queue 322, then the request cannot be added to the first queue. If assignment queue 312 determines that the total of (a) the estimated workload for the request and (b) estimated workload of requests within the first processing queue 322 from the same requestor does not exceed the maximum per-tenant workload for the first processing queue 322, then the request is assigned to the first queue.

The requests that were not added to the first queue may be added to another queue, e.g., the second processing queue 324. The assignment queue repeats the assignment process in relation to the second queue and attempts to add the request to the second queue based on the maximum per-tenant workload for the second processing queue 324. The process is repeated until the request is added to one of the n processing queues 322-326.

If the request is not successfully added to any of the n processing queues 322-326, then the assignment queue 312 may attempt to add the request to the overflow processing queue 328. In one embodiment, all requests (that were not added to any of n processing queues 322-326) may be added to the overflow processing queue without any constraints. In another embodiment, requests may only be added to the overflow queue if certain condition(s) are met. In one example, an overflow queue policy allows for the addition of a request to the overflow processing queue 328 only if the overflow processing queue 328 has no other requests from the same tenant. This overflow queue policy ensures that each tenant only has a single request in the overflow queue at any given time. In another example, an overflow queue policy establishes a maximum threshold for workload estimate corresponding to the request. As an example, a particular request may require a query to be executed against each record in a database. The workload estimate may include an estimated time of 20 hours for execution of the query. If the overflow queue policy establishes a maximum estimated runtime of 5 hours, the request may not be added to the overflow queue. In this case, the requestor may be informed that the request is invalid. The system may further provide information to the requestor indicating (a) the estimated runtime for the request is exceeds a threshold value and (b) splitting the query into more tailored specific queries is recommended.

In an embodiment, the overflow processing queue policy specifies different actions for handling a request. As an example, the overflow processing queue policy may specify a schedule (e.g., 2 a.m. to 5 a.m.) for handling requests with an estimated workload in a particular range a-b. The overflow policy may further specify that requests with an estimated workload greater than b are to be rejected.

Figure 3:
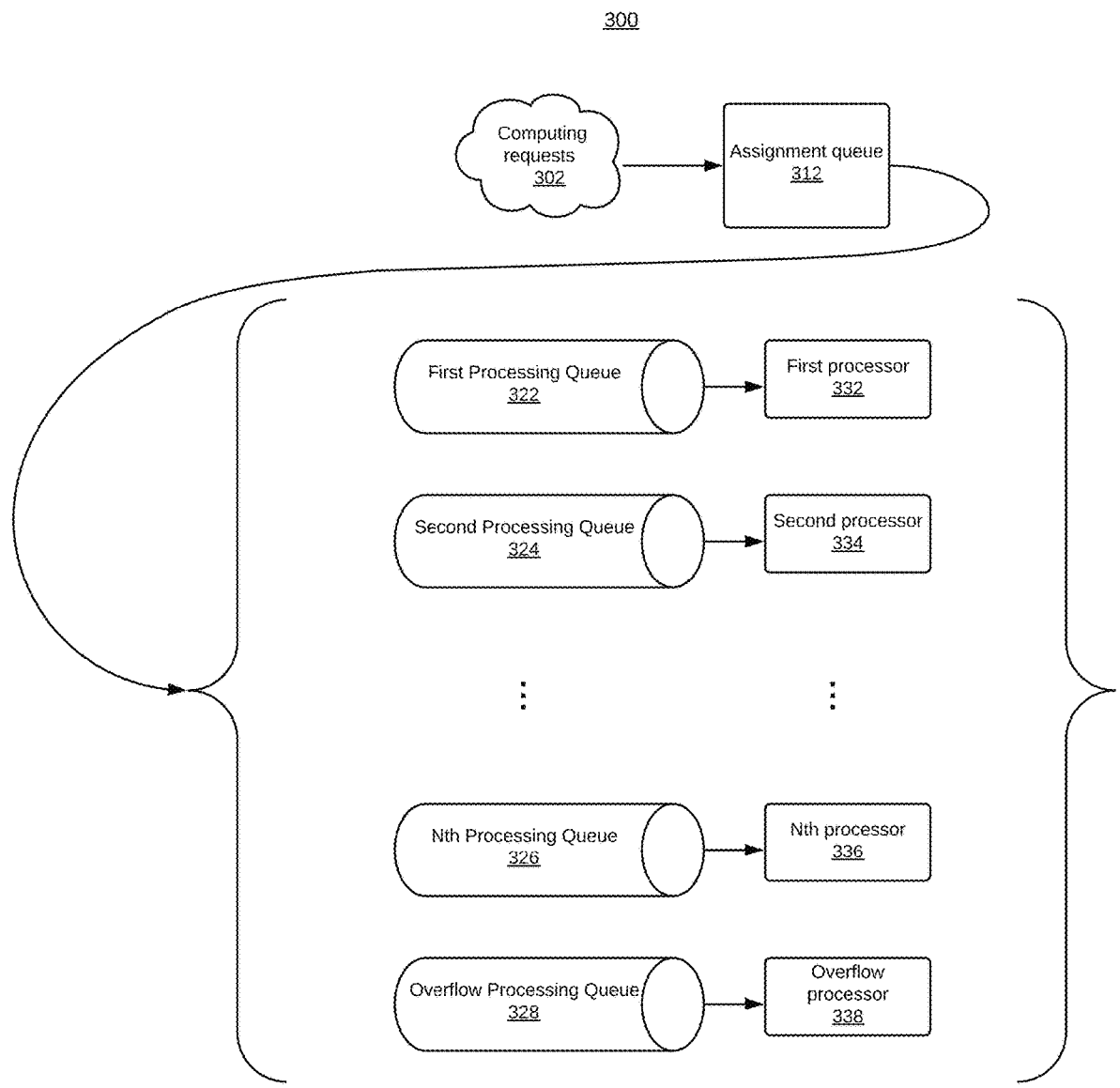
FIG. 3 is a diagram that illustrates the use of multiple queues a computing processing pipeline, in accordance with one or more embodiments.

In an embodiment, requests within each processing queue are processed by a request processor. Request processors are described above in further detail. The system may implement separate request processors for each queue (processors 332-338 as illustrated in FIG. 3) or a shared request processor across all queues. The set of request processors may correspond to individual processes that complete the requests using hardware shared across all request processors. Request processors may be referred to herein as "batch processors" as the request processors may process requests in batches as described below with reference to FIG. 4. The requests within a particular processing queue may be processed in a First In First Out (FIFO) order.

5. AN EXAMPLE OF MULTI-LAYER THROTTLING

FIG. 4 illustrates the processing of a set of requests in batches in accordance with one or more embodiments. The specific requests, operations, or configurations described below in relation to FIG. 4 are provided as examples and should not be interpreted as restricting the scope of any of the claims. Incoming requests 410 are received in an assignment queue 412. Each of the computing requests has been analyzed to estimate the workload needed to perform the computing request. In some embodiments, assignment queue 412 may be configured to assign a predetermined number of computing requests to one of processing queues 421, 422, 423, 424, or 425.

As illustrated, assignment queue 412 operates as a FIFO queue. As each new computing request is received, it is added to the back of the queue. Assignment queue 412 processes 8 computing requests in a batch. In some embodiment, more than 8 computing requests or less than 8 computing requests can be processed as a batch.

Each computing request is shown as a column including two rows. The top row indicates to the requestor which sent the computing request (indicated by one of t1, t2, t3, t4, t5, t6, t7, and t8). The bottom row indicates the number of tokens assigned to each computing request.

Each of processing queues 421, 422, 423, 424, and 425 are configured to receive computing requests from assignment queue 412 in a batch each time period. Each of the processing queues 421, 422, 423, 424, and 425 are configured to forward the computing requests to a request processor (not shown in FIG. 4). Each batch of requests 450, 460, and 470 corresponds to 20 seconds.

Each of first processing queue 421, second processing queue 422, third processing queue 423, and fourth processing queue 424 have a restriction on the size of computing tasks to be performed by the queue. First processing queue 421 is restricted to computing requests of 2 tokens per requestor per batch. Second processing queue 422 is restricted to computing requests of 4 tokens per requestor per batch. Third processing queue 423 is restricted to computing requests of 6 tokens per requestor per batch. Fourth processing queue 424 is configured to handle at most 1 computing request per batch for a requestor that has at least one computing request also being handled in a batch.

The overflow processing queue 425 is configured to handle remaining computing requests that do not meet the other requirements.

In the first batch 450, there are 8 computing requests as follows: requestor t1 has two requests of size 1, followed by requestor t2 with a request of size 2, followed by three requests by requestor t1 of size 1, followed by a request from requestor t3 of size 3, followed by a request of size 2 from requestor t1.

The computing requests may be divided among the queues in the following manner. First processing queue 421 is configured to handle requests with a limit of 2 tokens per requestor per batch. Thus, requestor t1's first two requests of size 1 and requestor t2's request of size 2 all meet that requirement and get sent to first processing queue 421. Because first processing queue 421 is limited to two tokens per requestor per batch, it cannot handle any further requests from requestor t1 because it is already handling 2 tokens from requestor t1. Nor can it handle t3's request of size 3 because the size of the request is greater than 2. Three requests of size 1 from requestor t1 get sent to second processing queue 422, along with a request from requestor t3 of size 3. The remaining request of size 2 from requestor t1 gets sent to third processing queue 423.

In the second batch 460, there are 8 computing requests as follows: requestor t1 has a request of size 1, followed by requestor t2 with a request of size 1, followed by a request from requestor t1 of size 2, followed by a request from requestor t1 of size 5, followed by a request from requestor t1 of size 2, followed by a request from requestor t3 of size 2, followed by a request from requestor t2 of size 1, followed by a request from requestor t3 of size 1.

The computing requests may be divided among the queues in the following manner. First processing queue 421 is configured to handle requests with a limit of 2 tokens per requestor per batch. Thus, the requests of size 1 from requestor t1 and t2 are sent to first processing queue 421, along with the request of size 2 from requestor t3. The other request of requestor t2 of size 1 is also sent to first processing queue 421. No other requests meet the requirements of first queue 421. Second processing queue 422 receives the request of size 1 from requestor t3. Third queue 423 receives the request of size 2 from requestor t3 and the request of size 2 from requestor t1. It should be seen that each of these requests also could be handled by second processing queue 422, without reaching the limits of the second processing queue described above (maximum size of 4 tokens per tenant per batch). Fourth processing queue 424 is configured to handle requests from a requestor that already has a request being handled by at least one of queues 421, 422, or 423 but the request does not meet the limitations of queues 421, 422, or 423. In this batch, fourth processing queue 424 receives the request from requestor t1 of size 5, because the request does not fit the limitations of processing queues 421, 422, or 423 and requestor t1 has a request in both processing queue 421 and processing queue 423.

In the third batch 470, there are 8 computing requests as follows. Requestor t4 has a request of size 2, followed by requestor t6 with a request of size 1 and requestor t7 with a request of size 1. Requestor t1 follows with a request of size 5, then a request of size 3 from requestor t1. A request from requestor t2 of size 2 follows. The final two requests are each of size 5 from requestors t4 and t6.

The computing requests may be divided among the processing queues in the following manner. First processing queue 421 is configured to handle requests with a limit of 2 tokens per requestor per batch. Thus, the requests of size 1 from requestors t6 and t7 are sent to first processing queue 421, along with the request of size 2 from requestor t4. The request of requestor t2 of size 2 is sent to second processing queue 422. (However, it may be noted that this request could also be sent to first queue 421.) No other requests meet the requirements of first processing queue 421 or second processing queue 422.

Third processing queue 423 receives the request of size 5 from requestor t4. Third processing queue 423 also receives the request of size 5 from requestor t6. Fourth processing queue 424 is configured to handle at most one request that cannot be handled by other queues. Here, all of the requests except the ones from requestor t1 can be handled by one (or more) of processing queues 421, 422, and 423. The requests from requestor t1 cannot be handled by fourth processing queue 424 because requestor t1 does not have any other requests being handled by one of processing queues 421, 422, or 423. Thus, the requests of requestor t1 of size 3 and size 5 are sent to overflow processing queue 425.

As described earlier, when requests are sent to overflow processing queue 425, a counter is incremented for the requestor. Here, tenant t1 is incremented by 2, because it is sending two requests to overflow processing queue 425. A delay may be implemented before the requests in overflow queue are processed. In such a manner, tenant t1 is prevented from overloading the system with an excessive amount of computing requests in a short period of time.

6. COMPUTER NETWORKS AND CLOUD NETWORKS

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 5:
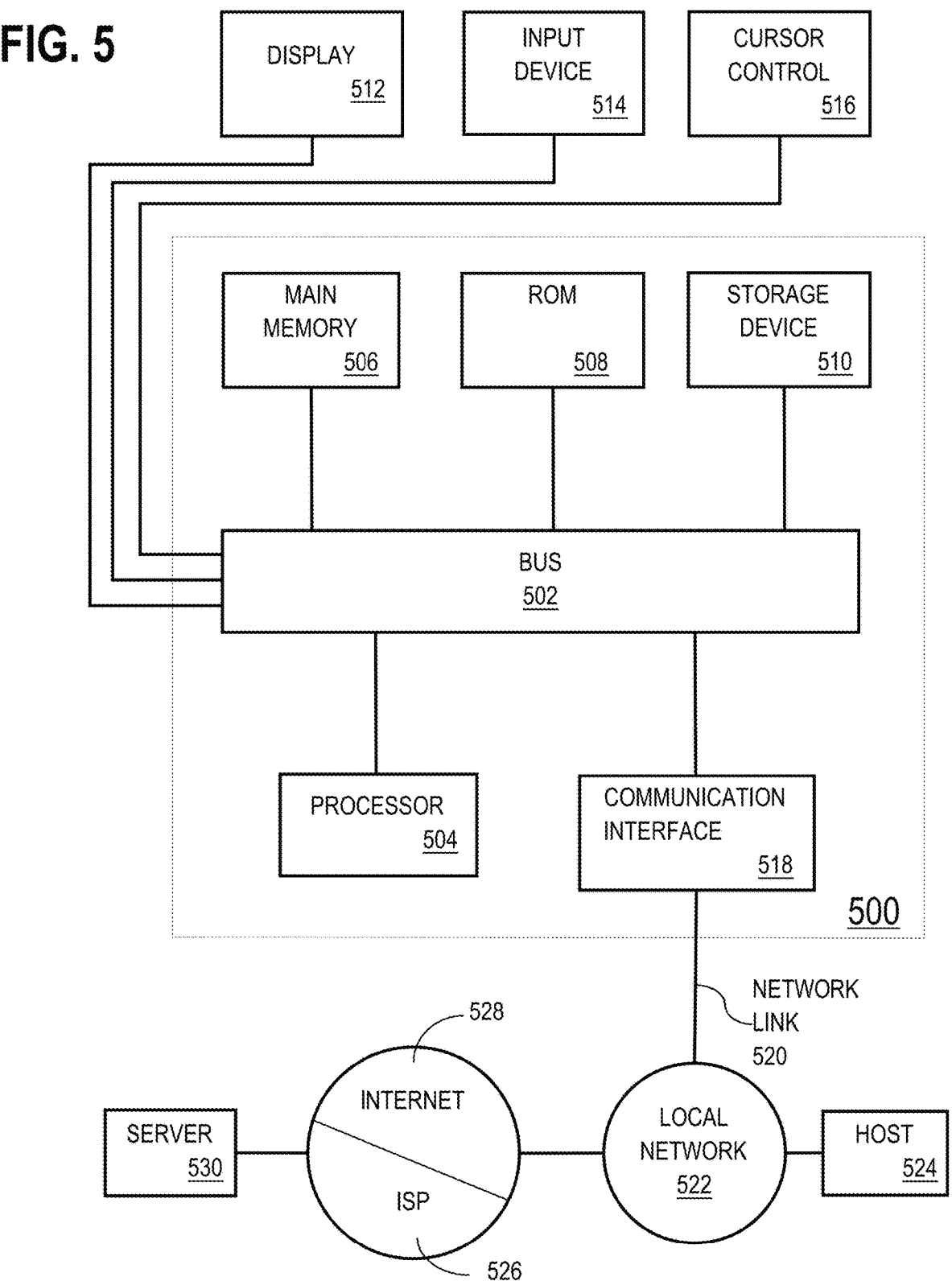
FIG. 5 shows a block diagram that illustrates a computer system in accordance with one or more embodiments.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, solid state drive, or optical disk, is provided and coupled to bus 502 for storing information and instructions.

Computer system 500 may be coupled via bus 502 to a display 512, such as a cathode ray tube (CRT) or liquid crystal display (LCD) monitor, for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that stores data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:

receiving a first computing request from a requestor for a first compliance assessment, the requestor being associated with a first number of tokens available to exchange for completion of computing requests;

determining (a) characteristics of targets in a first set of targets of the first computing request and (b) a first ruleset to be executed when completing the first computing request, the first ruleset indicating at least one condition for satisfying the first compliance assessment;

computing a first estimated amount of work for completing the first computing request based at least on the characteristics of targets in the first set of targets and the first ruleset to be executed when completing the first computing request;

responsive to determining that a second number of tokens, corresponding to the first estimated amount of work, is not more than the first number of tokens associated with the requestor:

debiting the second number of tokens from the first number of tokens associated with the requestor to result in the requestor being associated with a third number of tokens available to exchange for completion of subsequent computing requests; and causing completion of the first computing request by executing the first ruleset on each target in the first set of targets and determining whether each target in the first set of targets of the first computing request complies with the at least one condition for satisfying the first compliance assessment; and subsequent to completing the first computing request:

receiving a second computing request from the requestor for a second compliance assessment;

determining (a) a second number of targets in a second set of targets of the second computing request and (b) a second ruleset to be executed when completing the second computing request, the second ruleset indicating at least one condition for satisfying the second compliance assessment;

computing a second estimated amount of work for completing the second computing request based at least on the second number of targets and the second ruleset to be executed when completing the second computing request; and responsive to determining that a fourth number of tokens, corresponding to the second estimated amount of work, is more than the third number of tokens associated with the requestor:

performing one or more of delaying or canceling completion of the second computing request.

2. The medium of claim 1, wherein at least one of the characteristics of the targets in the first set of targets comprises a number of targets in the first set of targets.

3. The medium of claim 1, wherein at least one of the characteristics of the targets in the first set of targets comprises a location of each target in the first set of targets.

4. The medium of claim 1, wherein computing the first estimated amount of work based on the first ruleset comprises computing the first estimated amount of work based on a number of rules in the first ruleset.

5. The medium of claim 1, wherein computing the first estimated amount of work based on the first ruleset comprises computing the first estimated amount of work based on a type of each rule in the first ruleset.

6. The medium of claim 1, wherein canceling completion of the second computing request comprises transmitting a rejection message to the requestor in association with the second computing request.

7. A non-transitory computer readable medium comprising instructions which, when executed by one or more hardware processors, causes performance of operations comprising:

determining a first estimated workload for completing a first computing request from a first requestor for a first compliance assessment;

determining a second estimated workload for completing all computing requests from the first requestor already being handled by a first queue, the first queue being configured to handle requests from the first requestor and at least one second requestor;

determining a first total estimated requestor-specific workload for the first requestor as a function of at least the first estimated workload and the second estimated workload;

responsive to determining that the first total estimated requestor-specific workload exceeds a first threshold value, performing one or more of delaying or canceling adding the first computing request from the first requestor to the first queue, the first threshold value being a maximum workload for the first requestor in the first queue;

determining a third estimated workload for completing all computing requests from the first requestor already being handled by a second queue, the second queue being configured to handle requests from the first requestor and the at least one second requestor;

determining a second total estimated requestor-specific workload for the first requestor as a function of at least the first estimated workload and the third estimated workload;

responsive to determining that the second total estimated requestor-specific workload does not exceed a second threshold value, adding the first computing request to the second of queue, the second threshold value being a maximum workload for the first requestor in the second queue; and completing the first computing request in accordance with a process for completing computing requests in the second queue, wherein the process comprises executing a first ruleset on each target in a first set of targets of the first computing request and determining whether each target in the first set of targets complies with at least one condition indicated by the first ruleset.

8. The medium of claim 7, wherein the operations further comprise:

receiving a second computing request from the first requestor;

determining a second estimated workload for completing the second computing request;

determining a fourth estimated workload for completing all computing requests from the first requestor already being handled by a third queue, the third queue being configured to handle requests from the first requestor and the at least one second requestor;

determining a third total requestor-specific estimated workload for the first requestor as a function of at least the second estimated workload and and the fourth estimated workload;

responsive to determining that the third total estimated requestor-specific workload exceeds a third threshold value, performing one or more of delaying or canceling adding the second computing request from the first requestor to the third queue, the third threshold value being a maximum workload for the first requestor in the third queue;

determining a number of computing requests from the first requestor in an overflow queue; and responsive to determining the number of computing requests from the first requestor in the overflow queue is less than a maximum number, adding the second computing request to the overflow queue.

9. The medium of claim 8, wherein the number of requests from the first requestor in the overflow queue is zero prior to adding the second computing request to the overflow queue, and the maximum number is one.

10. The medium of claim 8, wherein the computing requests from the first requestor already being handled by the first queue correspond to requests received from the first requestor during one or more of a first time window or a second time window.

11. The medium of claim 8, wherein the computing requests from the first requestor already being handled by the first queue correspond to requests added to the first queue from a same batch as the first computing request.

12. The medium of claim 8, further comprising:
responsive to adding the second computing request to the overflow queue, incrementing a counter for the first requestor; and
adding a delay to computing requests in the overflow queue from the first requestor, a length of the delay being based on the counter.

13. The medium of claim 12, wherein the delay is further based on an elapsed time since a previous request from the first requestor was processed in the overflow queue.

14. The medium of claim 7, wherein the operations further comprise:
receiving a second computing request from the first requestor;
determining a second estimated workload for completing the second computing request;
determining a fourth estimated workload for completing all computing requests from the first requestor already being handled by a third queue, the third queue being configured to handle requests from the first requestor and the at least one second requestor;
determining a third total estimated requestor-specific workload for the first requestor as a function of at least the second estimated workload and the fourth estimated workload;
responsive to determining that the third total estimated requestor-specific workload exceeds a third threshold value: performing one or more of delaying or canceling adding the second computing request from the first requestor to the third queue, the third threshold value being a maximum workload for the first requestor in the third queue;
determining a number of computing requests from the first requestor in an overflow queue; and
responsive to determining the number of computing requests from the first requestor in the overflow queue is at least a maximum number: performing one or more of delaying or canceling adding the second computing request to the overflow queue.

15. The medium of claim 7, wherein determining the first estimated workload for completing the first computing request comprises:
determining the first estimated workload based on (a) characteristics of each target in the first target set for the first computing request and (b) the first ruleset, the first ruleset indicating the at least one condition for satisfying the first compliance assessment.

16. The medium of claim 15, wherein at least one of the characteristics of the targets in the first target set comprises a number of targets in the first target set.

17. The medium of claim 15, wherein at least one of the characteristics of the targets in the first target set comprises a location of each target in the first target set.

18. The medium of claim 15, wherein computing the first estimated workload based on the first ruleset comprises computing the first estimated workload based on a number of rules in the first ruleset.

19. The medium of claim 15, wherein computing the first estimated workload based on the first ruleset comprises computing the first estimated workload based on a type of each rule in the first ruleset.

20. The medium of claim 15, wherein determining the first estimated workload for completing the first computing request is based on one or more of: a size of a file transfer operation required by the first computing request, a type of file transfer operation required by the first computing request, a number of entities required for an assessment for completing the first computing request, or a type of assessment required for the first computing request.

21. The medium of claim 7, wherein adding the first computing request to the second queue is further responsive to determining that a first set of tokens associated with the first requestor is greater than a second set of tokens corresponding to the first estimated workload for completing the first computing request.

22. A method comprising:
determining a first estimated workload for completing a first computing request from a first requestor for a first compliance assessment;
determining a second estimated workload for completing all computing requests from the first requestor already being handled by a first queue, the first queue being configured to handle requests from the first requestor and at least one second requestor;
determining a first total estimated requestor-specific workload for the first requestor as a function of at least the first estimated workload and the second estimated workload;
responsive to determining that the first total estimated requestor-specific workload exceeds a first threshold value, performing one or more of delaying or canceling adding the first computing request from the first requestor to the first queue, the first threshold value being a maximum workload for the first requestor in the first queue;
determining a third estimated workload for completing all computing requests from the first requestor already being handled by a second queue, the second queue being configured to handle requests from the first requestor and at least one second requestor;
determining a second total estimated requestor-specific workload as a function of at least the first estimated workload and the third estimated workload;
responsive to determining that the second total estimated requestor-specific workload does not exceed a second threshold value, adding the first computing request to the second queue, the second threshold value being a maximum workload for the first requestor in the second queue; and
completing the first computing request, in accordance with a process for completing computing requests in the second queue, wherein the process comprises executing a first ruleset on each target in a first set of targets of the first computing request and determining whether each target in the first set of targets complies with at least one condition indicated by the first ruleset, and wherein the method is executed by at least one device including a hardware processor.

23. A system comprising:

at least one hardware processor;

the system being configured to perform operations comprising:

determining a first estimated workload for completing a first computing request from a first requestor for a first compliance assessment;

determining a second estimated workload for completing all computing requests from the first requestor already being handled a first queue, the first queue being configured to handle requests from the first requestor and at least one second requestor;

determining a first total estimated requestor-specific workload for the first requestor as a function of at least the first estimated workload and the second estimated workload;

responsive to determining that the first total estimated requestor-specific workload exceeds a first threshold value, performing one or more of delaying or canceling adding the first computing request from the first requestor to the first queue, the first threshold value being a maximum workload for the first requestor in the first queue;

determining a third estimated workload for completing all computing requests from the first requestor already being handled by a second queue, the second queue being configured to handle requests from the first requestor and the at least one second requestor;

determining a second total estimated requestor-specific workload for the first requestor as a function of at least the first estimated workload and the third estimated workload;

responsive to determining that the second total estimated requestor-specific workload does not exceed a second threshold value, adding the first computing request to the second queue, the second threshold value being a maximum workload for the first requestor in the second queue; and completing the first computing request in accordance with a process for completing computing requests in the second queue, wherein the process comprises executing a first ruleset on each target in a first set of targets of the first computing request and determining whether each target in the first set of targets complies with at least one condition indicated by the first ruleset.

* * * * *

UNITED STATES PATENT AND TRADEMARK OFFICE
CERTIFICATE OF CORRECTION

PATENT NO. : 11,321,135 B2
APPLICATION NO. : 16/670072
DATED : May 3, 2022
INVENTOR(S) : Chiplunkar et al.

It is certified that error appears in the above-identified patent and that said Letters Patent is hereby corrected as shown below:

In the Claims

In Column 18, Line 36, in Claim 7, before "queue," delete "of".

In Column 18, Line 59, in Claim 8, delete "and and" and insert -- and --, therefor.

In Column 22, Line 18, in Claim 23, delete "request" and insert -- request, --, therefor.

Signed and Sealed this
Thirtieth Day of August, 2022

Katherine Kelly Vidal
*Director of the United States Patent and Trademark Office*